(12) United States Patent
Seliger et al.

(10) Patent No.: US 8,608,050 B2
(45) Date of Patent: Dec. 17, 2013

(54) RE-USABLE, KNOCK-DOWN BOX APPARATUS AND METHOD

(76) Inventors: Barton J. Seliger, Orem, UT (US);
Michael S. Nebeker, Sandy, UT (US)

( * ) Notice: Subject to any disclaimer, the term of this patent is extended or adjusted under 35 U.S.C. 154(b) by 394 days.

(21) Appl. No.: 12/896,882

(22) Filed: Oct. 3, 2010

(65) Prior Publication Data

US 2012/0080510 A1    Apr. 5, 2012

(51) Int. Cl.
*B65D 5/42* (2006.01)
*B65D 5/66* (2006.01)
*B31B 5/00* (2006.01)

(52) U.S. Cl.
USPC .................... 229/117.16; 229/125; 493/84

(58) Field of Classification Search
USPC .......... 229/125, 141, 117.04, 103.3; 493/121; 206/736, 45.2, 45.21
See application file for complete search history.

(56) References Cited

U.S. PATENT DOCUMENTS

| | | | | |
|---|---|---|---|---|
| 1,149,891 A | * | 8/1915 | Billstein | 206/45.29 |
| 1,251,008 A | * | 12/1917 | Furste | 206/45.29 |
| 3,889,868 A | * | 6/1975 | Bruckner et al. | 229/125 |
| 5,494,214 A | * | 2/1996 | Fleury et al. | 229/149 |
| 6,158,579 A | * | 12/2000 | Rosenbaum | 206/45.29 |
| 7,481,355 B2 | | 1/2009 | Hui | |
| 2004/0140345 A1 | | 7/2004 | Kao | |
| 2005/0279816 A1 | | 12/2005 | Kao | |

\* cited by examiner

*Primary Examiner* — Gary Elkins
*Assistant Examiner* — Christopher Demeree
(74) *Attorney, Agent, or Firm* — Pate Baird, PLLC

(57) ABSTRACT

An apparatus formed from a single piece of planar material as a continuous and contiguous structure is foldable into a re-usable, knock-down box. A bottom panel supports contents placeable in the box. A front panel and a rear panel operate as shear walls to support the bottom. End panels act as shear walls adjacent to and extending between the front panel, rear panel, and bottom panel. Hinge panels are formed with a free portion, extending from an edge of one of the end, front, and rear panels, and a fixed portion, fixed to a surface of an adjacent one of the end, front, and rear panels to fix the positions of the front, rear, and end panels with respect to each other and the bottom panel in an assembled configuration. Drawing a front edge of the lid toward the front panel, one may lock the lid against the front panel by inserting a tab portion of the lid into a slot formed between the front panel and the front tuck panel.

15 Claims, 16 Drawing Sheets

RE-USABLE, KNOCK-DOWN BOX APPARATUS AND METHOD

BACKGROUND

1. The Field of the Invention

This invention relates to containers and, more particularly, to novel systems and methods for re-usable, knock-down boxes.

2. The Background Art

General merchandise boxes may be packed with a selection of various products. In certain circumstances, a box may be filled with articles all constituting the same product. Nevertheless, general merchandise shipping boxes are typically of two types. The first type is polymer resin crates. These crates may be sealed boxes or other configurations.

The other, and most common general merchandise box is a corrugated fiber board or "cardboard" box. These boxes are very similar to the corrugated cardboard boxes often purchased for moving household goods. Four flaps form the bottom, and are folded and taped to seal the bottom of the box. The box is sealed with the similar, often identical, array of top flaps. The top flaps may be connected to one another with small connecting members of the basic material of the box, or may be free standing, and completely separated.

Typically, when such a box is filled, the bottom has been folded and taped in order to stabilize the box from a flattened condition to a box shape. A user must either fold the top flaps down around the box, or leave the flaps in the position they tend to take. In some circumstances, the flaps remain rigid and pointing upward, parallel to the box sides from which they proceed. In other circumstances, the flaps continue to flap at random away from the opening of the box, and more often toward the opening of the box.

Users have great difficulty in filling such boxes. The top flaps tend to form "stand offs" by their very dimensions. If the flaps are connected to one another or otherwise still standing vertically, then a user must bend over to reach down into the box to place anything on the bottom of the box. Meanwhile, if the flaps are extending away from the box walls, then they form a horizontal stand off pushing the user away from the interior of the box where items must be placed.

Finally, flaps typically tend to fold inward, and thus return to their equilibrium position angling inward and obstructing access to the interior of the box. Thus, each item placed must require of the user to either hold the flaps out of the way, or to reach in and pull the flaps back in order to add each respective item.

Conventional boxes have other difficulties. Plastic or polymer resin crates are often damaged, scraped, scratched, and otherwise rendered undesirable. They may need to be scrubbed periodically with high-pressure and high-temperature fluids, such as water, soap, and the like. Meanwhile, they tend to be quite expensive, and when damaged must often be destroyed.

Conventional cardboard boxes are not without their issues. Typically, they may only be used one time. Thereafter, they are immediately cut down, baled into bales, and returned to a paper manufacturing company for recycling. The plastic tape used to seal the boxes must be removed from the mushy vats of recycled fibers after the box material has been thoroughly soaked, separated, and returned into a slurry of paper pulp. Removal of the strings of tape is necessarily problematic.

Boxes secured with staples and other fasteners, glues, and the like each have their own difficulties. Ultimately, recycling is not re-use, and re-use is virtually impossible. For example, to reuse a box, that box must be transported from the receiver who originally unloaded the contents out of the box, and return to some sort of supplier for reuse. The nature of boxes is such that their volume is disproportionately very large compared to their weight. Unless the boxes can be dismantled, they cannot be reused.

Stripping off tape, tearing out staples, and like basically amount to destroying the box. So much damage happens to the structure of the box that reuse is impractical. By impractical, reuse is so horribly expensive and of low yield that recycling works better. The amount of energy, shipping, and labor required to reuse boxes, particularly where they may have various random sizes is simply not typically done.

What is needed is a box that can be used multiple times, but which can be discarded when it begins to fail structurally, or when it has been soiled or otherwise rendered unsuitable for reuse. It would be an advance in the art, for example, to provide a fiber board box that can be shipped to a user location in a knocked-down configuration. It would be a further advance in the art to have the box completely connected and sealed at all locations except the lid closure. It would be a further advance in the art to provide such a box that could be easily erected to an assembled condition with a minimum of effort and movement.

It would be a further advance in the art if such a box had a lid, and other parts that could be completely removed from the work space of a user trying to fill the box. For example, it would be an advance in the art to remove or eliminate flaps that would otherwise obstruct a user's access to the box.

It would be a further advance in the art to provide a box that can be knocked-down without having to remove tape, glue, staples, or any other fasteners in order to return the box to its original knocked-down configuration for shipping.

It would be a further advance in the art to form a sturdy box that is strong enough to serve, tough enough to withstand a certain amount of use and abuse, and which could be assembled and disassembled without tools for use and reuse.

BRIEF SUMMARY OF THE INVENTION

In view of the foregoing, in accordance with the invention as embodied and broadly described herein, a method and apparatus are disclosed in one embodiment of the present invention as including an apparatus formed from a single piece of planar material as a continuous and contiguous structure, foldable into a re-useable, knock-down box. The apparatus may include a bottom panel to support contents placeable in the box, front and rear panels operating as shear walls to support the bottom and end panels adjacent to and extending between the front panel, rear panel, and bottom panel. Hinge panels are formed with a free portion, extending from an edge of one of the end, front, and rear panels, and a fixed portion. The fixed portion is fixed (e.g. glued flat) to a surface of an adjacent one of the end, front, and rear panels. This fixes the positions of the front, rear, and end panels with respect to each other and the bottom panel in an assembled configuration.

Each hinge panel may have a scored region, between the free and fixed portions, bending therealong to form a hinge line. A front tuck panel extends downward from its fold line at the top of the front panel to end proximate the bottom panel. End tuck panels extend from the top of respective end walls and extend downward to be fixed to the bottom panel. A lid is flexibly secured to the rear panel at a mutual fold line. It may thus selectively tilt with respect thereto between an open position away from the front panel and a closed position at the front panel.

In certain embodiments of an apparatus and method in accordance with the invention a box may be formed with a lid having a score mark there along in order to provide a stand portion and a face portion or panel. Thus, the lid may be folded along the score line in order to present the lid similar to a PDQ display box. For example, the lid may extend upward from the back of the box, and then fold at the score line to return back toward the top of the box, the front or face panel of the lid being held by a retainer. The retainer may keep the face panel close to the back of the box, and likewise be stand panel portion of the lid, in order to keep the work space clear and access to the box available.

In certain embodiments the lid may include a tongue panel or tongue that operates as a tap foldable from the front of the lid and sized to be received behind the front wall or front panel of the box. For example, a slot may be formed between a front panel and a tuck panel connected to the top of the front panel but folded down there from toward the bottom panel of the box. Thus, the front wall of the box, the wall against which the user stands closest is effectively double in thickness. Between those two thicknesses, the front panel itself, and the front tuck panel folded down there from toward the bottom panel of the box secures the tongue of the lid in order to maintain the lid in position when the box in a closed configuration.

In certain embodiments, the end panels of the box may likewise be connected at their top edges to end tuck panels. The end tuck panels may fold directly from the top of each respective end panel to fold down toward the bottom panel of the box. The bottom panel or floor of the box thus may have apertures formed to receive tabs locking the end tuck panels with respect to the bottom panel and securing a double thickness at each end of the box. The tucked panels connected to the ends of the box may be off set the ledge space extending along the top of the end panel and the resulting top of the tuck panel. Thus, additional bearing surface may be created at each end of the box. Meanwhile, handles may be formed by cutting openings, and folding the material from the openings into the box from the end wall. This handle may thus be provided additional finger space for a user to lift the box due to the offset that a ledge spaces the end tuck panel away from the end wall or end panel.

In certain embodiments, the tuck panels may be provided with tabs extending from the extremities thereof and tucking into apertures in the bottom or into the front, back, or both of walls of the box.

In one embodiment, hinge panels may be contiguous with the end panels and folded at score lines in order to connect to the back and front panels of the box. The hinge panels may be suitably scored along a diagonal therethrough.

For example, a hinge panel may be formed as a rectangular extension from each end panel. For example, each side, front and back or each edge, front and back, of each end panel may have a score line about which pivots or bends a rectangular hinge panel. The hinge panel in turn, may be scored from its bottom corner closest to the end panel upward to its opposite diagonal corner. The lower portion below the diagonal score line may be glued, stapled, or otherwise fastened to the adjacent front or back panel of the box. This leaves the diagonal score line as a hinge line permitting the end wall to fold down toward the bottom of the box, while the hinge panel bends along its center diagonal to form two adjacent hinged triangles.

Meanwhile, when the ends are pulled apart or lifted apart, the hinge panels draw the front and back panels of the box together, and upright to the erect or assembled configuration.

Meanwhile, a front tuck panel folded down from the top of the front panel of the assembled box may rigidize or stabilize the ends with respect to one another and the front panel. Meanwhile, the end tuck panels may be folded down from the top of the end panels towards the floor or bottom panel of the box, where they may be received by apertures or where tabs at the extremities thereof may be received by apertures to lock the box in the assembled configuration.

In certain embodiments, the rectangular hinge panels connected to the front panel to the box may be provided with a certain relief sized to receive the tongue panel of the lid directly against the front panel of the box without obstruction. Meanwhile, additional tongue panels to lock the lid in a forward position down against the end and front panels of the box may be accomplished by forming slots in each of the end panels, or rather in the ledge extending horizontally between the top of the end panel and the top of the end tuck panel in order to receive tongue panels from the top of the lid thereinto. Thus a combination of one, two, three, or more tongue panels may extend downward from the lid into the spaces between wall panels and their associated tuck panels.

Handles at the end of the box may be formed by cutting through the end walls and pushing the material within the circumscribe of the cut inward. Thus, a handle may be formed with the cut out portion folding upward and inward into the end wall to form a handle. The space formed by the stand off of the ledge spacing apart each end wall or end panel and its respective end tuck panel may provide space for fingers of a user.

Boxes may be maintained in the sealed condition with no tape, sealers, staples or the like. Alternately, for security, any edges may be sealed. Nevertheless, the box need not sustain any damage other than a certain amount of wear if no fasteners are used. For example, the locking tabs or tongue panels may simply be drawn out of their respective walls in order to release the lid and open the box to expose its contents for unloading.

The entire box may be knocked down with a few simple motions, such as by a user reaching down to the bottom edge of each end tuck panel and freeing it from the bottom of the box, lifting it out of the box. Likewise, a handle at the bottom edge of the front tuck panel may be used to access it and draw it upward and out of the box. With all the tuck panels removed, the hinge panels may be folded down, as the ends are folded together, or toward each other. The front panel and back panel may extend outward therefrom, with the front tuck panel and the lid folded back over the top of the folded down box in its knock-down position. This entire re-folded box may now be stacked up or placed in a container with other boxes in order to be returned to a shipping site for complete reuse.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of an apparatus in accordance with the invention and are, therefore, not to be considered limiting of its scope, the invention will be described with additional specificity and detail through use of the accompanying drawings in which:

FIG. 5B is a rear elevation view of the box of FIG. 5a;

FIG. 5C is a right side elevation view of the box of FIG. 5a;

FIG. 5D is a left side elevation view of the box of FIG. 5a;

FIG. 5E is a top plan view of the box of FIG. 5a;

FIG. 5F is a bottom plan view of the box of FIG. 5a;

FIG. 6B is a rear elevation view of the box of FIG. 6a;

FIG. 6C is a right side elevation view of the box of FIG. 6a;

FIG. 6D is a left side elevation view of the box of FIG. 6a;

FIG. 6E is a top plan view of the box of FIG. 6a;

FIG. 6F is a bottom plan view of the box of FIG. 6a;

FIG. 7B is a rear elevation view of the box of FIG. 7a;

FIG. 7C is a left side elevation view of the box of FIG. 7a;

FIG. 7D is a right side elevation view of the box of FIG. 7a;

FIG. 7E is a top plan view of the box of FIG. 7a;

DETAILED DESCRIPTION OF THE PREFERRED EMBODIMENTS

Figure 1:
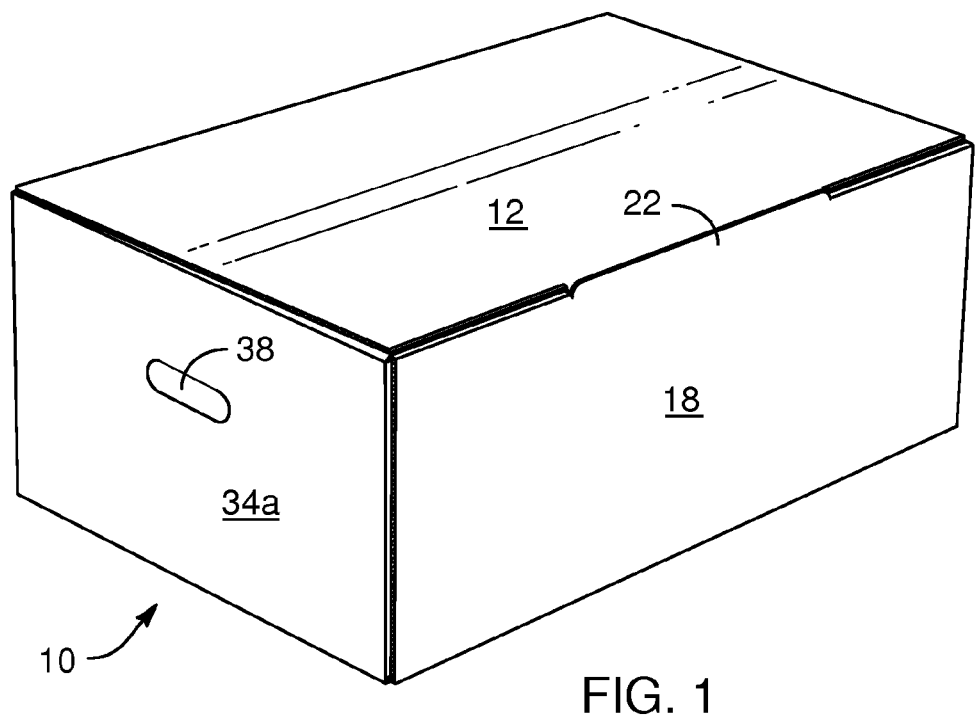
FIG. 1 is a top, frontal, isometric view of a closed box in accordance with the invention in an assembled configuration.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 2:
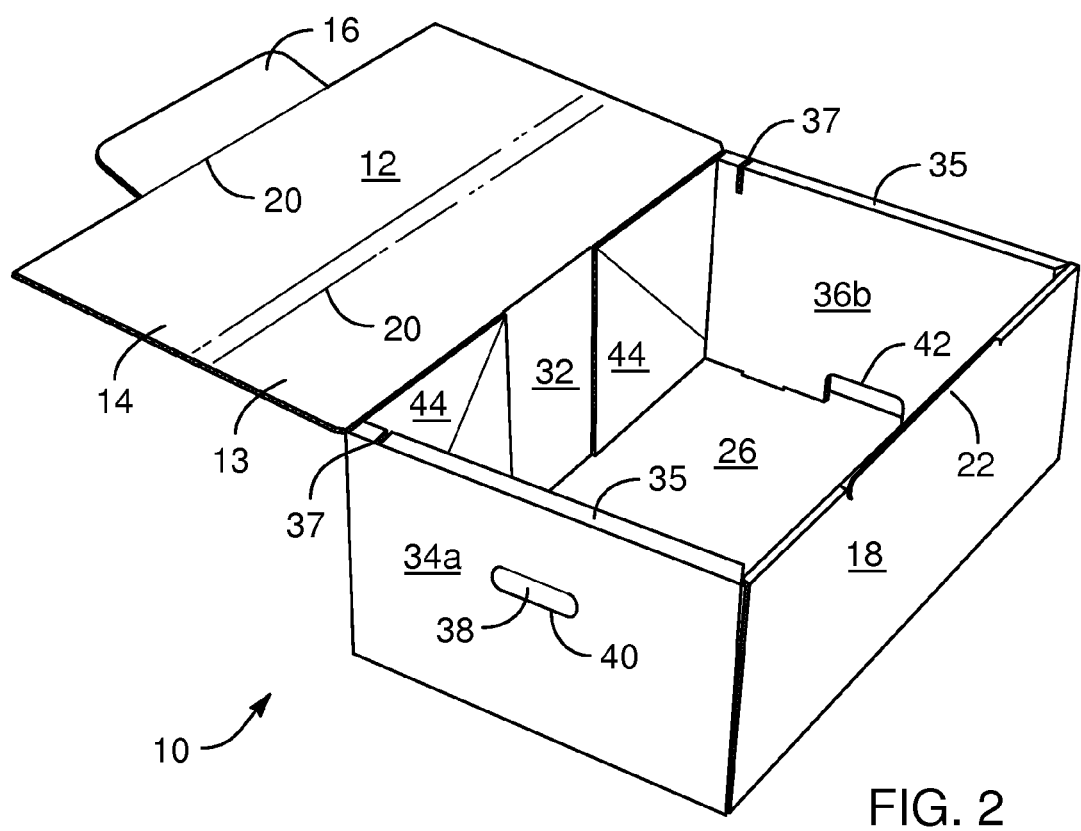
FIG. 2 is a frontal, top, isometric view of the box of FIG. 1 in an open condition.

Referring to FIGS. 1-2, while referring generally to FIGS. 1-14, a box 10 may be formed having a lid 12. The lid 12 in certain embodiments may be marked or scored to divide into two portions, a stand panel 13 closest to and attached to the back of the box 10, and a face panel 14 connected to the stand panel. As a practical matter, the lid 12 may be formed of a single continuous piece of material.

In fact, in one currently contemplated embodiment, the box 10 itself is formed of a single, contiguous, continuous piece of a sheet-like material. The material may be any natural or synthetic product (e.g. plastic, paper, composite, foam core, etc.) formable as a sheet, sufficiently flexible to fold, and sufficiently stiff to form walls. Hereinafter, corrugated cardboard will be used as an example, but any suitable sheet material is intended thereby.

For example, the box 10 may be formed of a corrugated fiber board, commonly referred to as box board or corrugated cardboard. The entire box 10 may be cut from a single, continuous and contiguous piece, with every panel and portion of the box being a part of that continuous material. As a result, the material properties through the layer of planar material are the same throughout the entire extent of the planar extent of the box.

The lid 12 may include a tongue panel 16 configured to draw the lid 12 or hold the lid 12 forward toward the front panel 18 of the box 10 when closed. In fact, the score lines 20 separating or defining the stand panel 13 from the face panel 14 may be a cut, but may typically be simply a portion where the outer layers of the corrugated, foamed or other, spaced-apart, double layered material have simply been stamped, pressed, or otherwise moved closer together in order to remove the stiffness of their original section modulus (e.g. engineering property controlling structural stiffness of a material).

Section modulus is the property characterizing the material and its distance from the central or neutral axis having no stress. Accordingly, by forming a piece of corrugated cardboard, a manufacturer places two tensile members, the two outer layers, to support the mechanical loads, and places the corrugated or other central filler material in between in order to space the outer layers apart. This results in placing the maximum amount of strong material at the outermost fiber, thus supporting maximum bending loads with a minimum amount of weight and material.

Accordingly, score lines 20 may be formed in the material of the box 10 by simply crushing the internal corrugations and placing the outer materials in closer proximity, in order to promote bending at the score lines 20. In some materials, e.g. solid polymers, scorelines may be molded or cut as grooves.

In this way, the tongue panel 16 may be defined by score lines 20 between and the face panel 14 of the lid 12. Similarly, the lid 12 itself may be separated from other portions of the box 10 by score lines 20 therealong.

The tongue panel 16 may fit into a slot 21. Nevertheless, in order to ease the manufacturing or assembly process, the box 10 may be formed with a register panel 22 extending from the front 18 of the box 10, or the front panel 18 of the box 10. In this embodiment, the slot 21 is formed by cutting into the front panel 18 to form the slot 21, but not cutting the slot 21 completely free. In this way, a register panel 22 may be left connected to the front panel 18, and thus will stand up when a tuck panel 24 is folded along its score line 20 downward behind the front panel 18.

In one presently contemplated embodiment, the tuck panel 24 may simply be an extension of the front panel 18 in the original piece of planar material from which the box 10 is cut. Thus, when the slot 21 is cut, it is cut as a long oval, but one of the long straight sides is left connected, in the front panel 18. Accordingly, when the tuck panel 24 or front tuck panel 24 is folded with respect to the front panel 18, the register panel 22 remains substantially rigid and extending in the plane of the front panel 18.

This provides a slight rise by the register panel 22, and a lower positioning of the slot 21 therebelow. Accordingly, when the lid 12 is pulled forward toward the front panel of the box 10, a user may simply place the tongue panel 16 against the register panel 22, and the register panel 22 will guide the tongue panel 16 down into the slot 21. This saves time, alignment, user skill, and damage to the materials.

The supporting panel 26 of the contents of the box 10 is the bottom panel 26. Articles will be placed on the bottom panel 26 of the box 10 during loading. The bottom panel 26 may be provided with apertures 28, which may be referred to as lock apertures 28. The lock apertures 28 may instead, alternatively, be placed in the front and back panels of the box 10. Nevertheless, maximum leverage, and simplicity of operation do occur when the apertures 28 are placed in the bottom 26 of the box 10. Each of the apertures 28 may be sized as an elongated slot 28 to receive a tab 30.

The tabs 30 may be single, double, or of any number. The tabs 30 extend from the tuck panels 36 on the left and right ends of the box 10. For example, the box 10 may have a back panel 32. The back panel 32 and the front panel 18 form the back and front walls of the box 10. Meanwhile, extending between the front 18 and back panels 32 are the left end 34a and the right end panel 34b of the box 10. Accordingly, tabs 30 extending from tuck panels 36a, 36b may be tucked into the apertures 28 to lock the tuck panels 36 into place.

In certain embodiments, the box 10 may be assembled from a knocked down configuration by lifting the ends 34 or end panels 34 away from one another. The front panel 18 and back panel 32 are drawn upward as the end panels 34 are erected to a vertical position, with respect to the bottom panel 26 acting as a horizontal floor. In certain embodiments, the ends 34 or end panels 34a, 34b may connect to ledge portions 35 or ledges 35, which then continue on to the tuck panels 36a, 36b, respectively. In this way, the ledge 35 provides an offset 35 spacing each of the tuck panels 36 away from its respective end panel 34.

Figure 3:
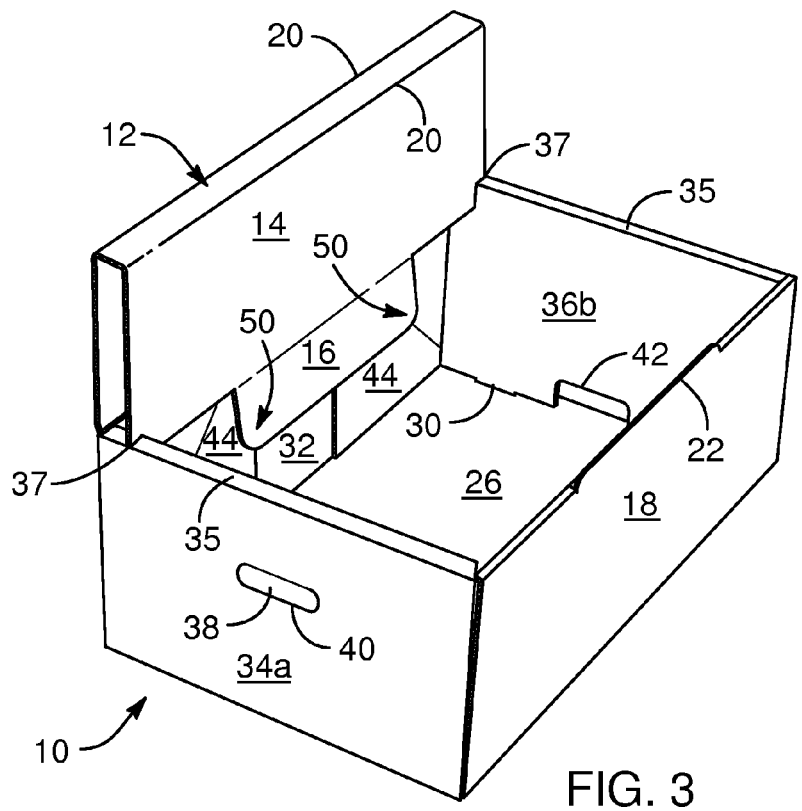
FIG. 3 is a frontal, top, isometric view of the box of FIG. 1 in an alternative open condition, having the lid folded over in a retained condition ready for filling or unloading.
Figure 4:
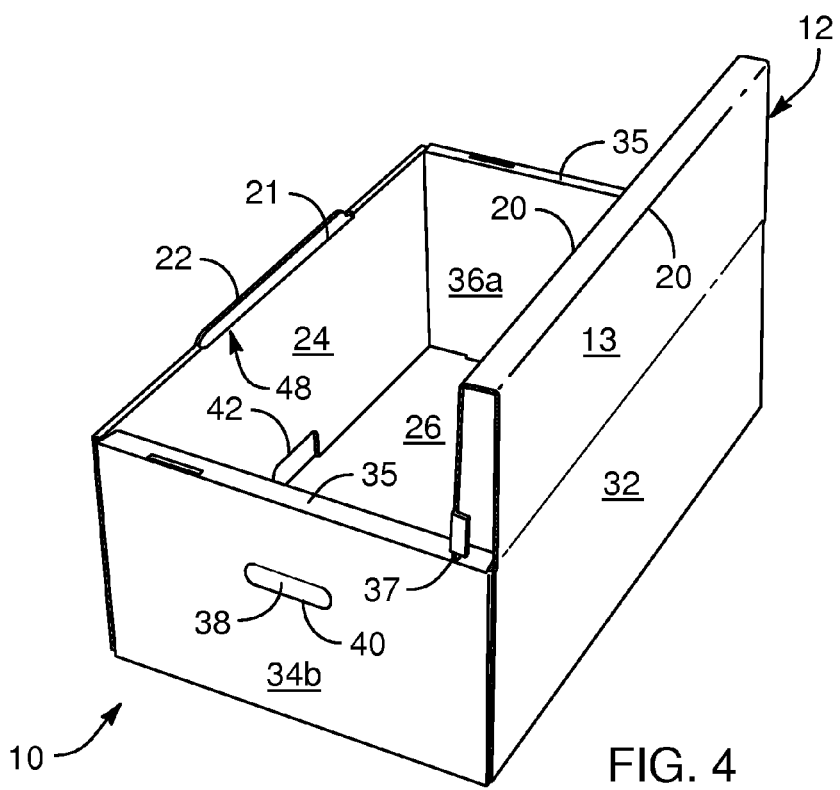
FIG. 4 is a rear, isometric view of the box of FIG. 1, in the condition illustrated in FIG. 3.
Figure 5A:
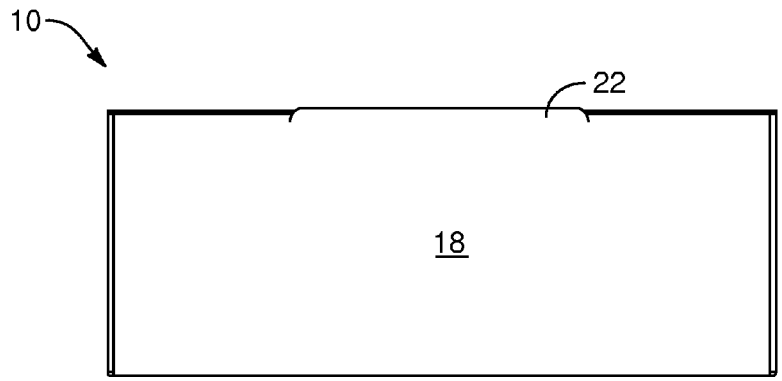
FIG. 5A is a front elevation view of the box of FIG. 1 having the lid in a closed condition.
Figure 5B:
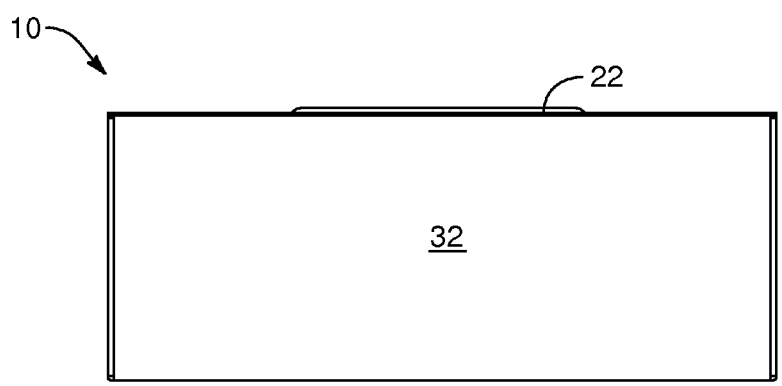
Figure 5C:
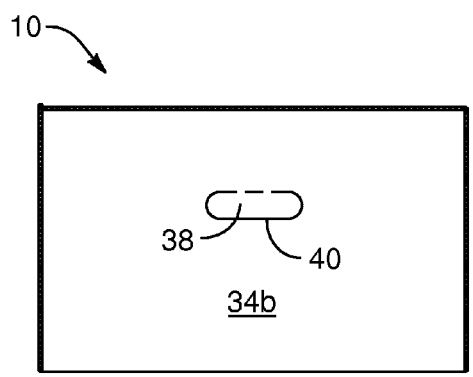
Figure 5D:
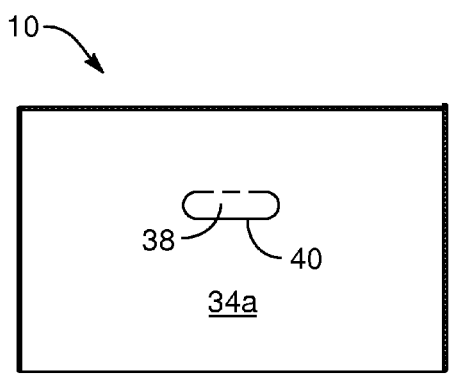
Figure 5E:
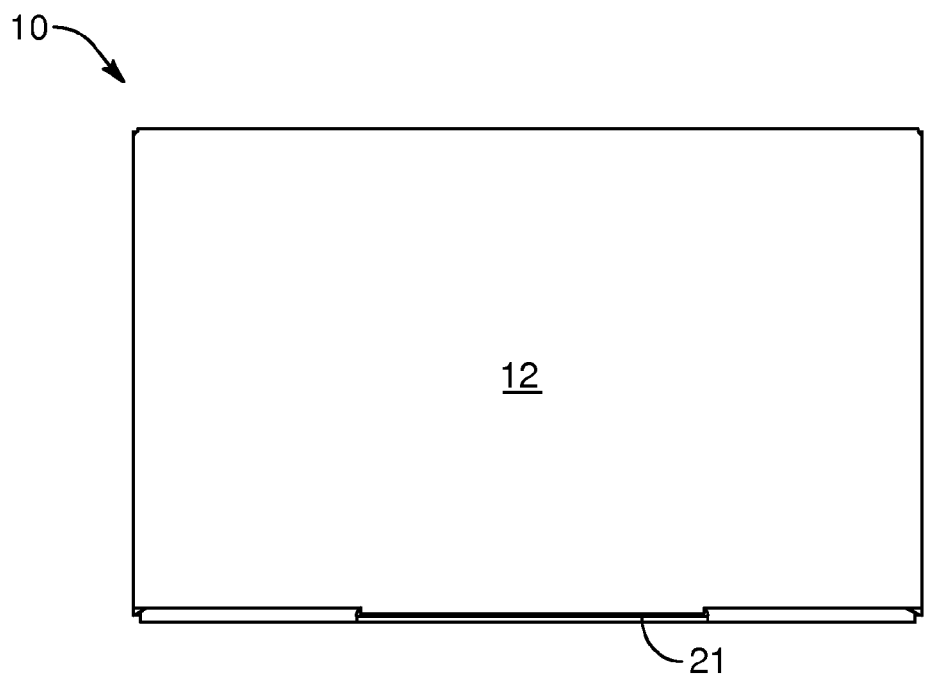
Figure 5F:
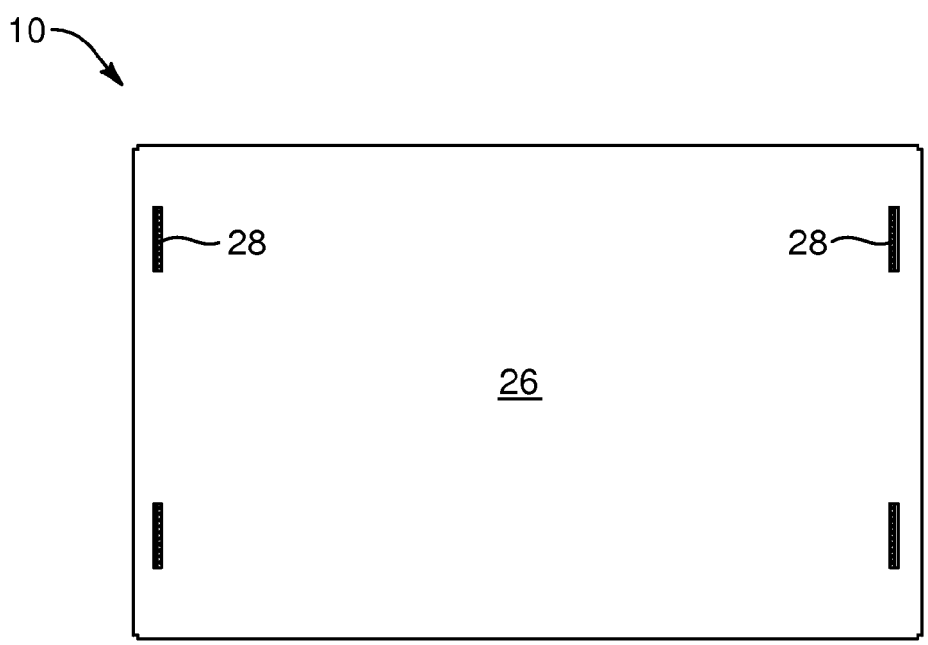
Figure 6A:
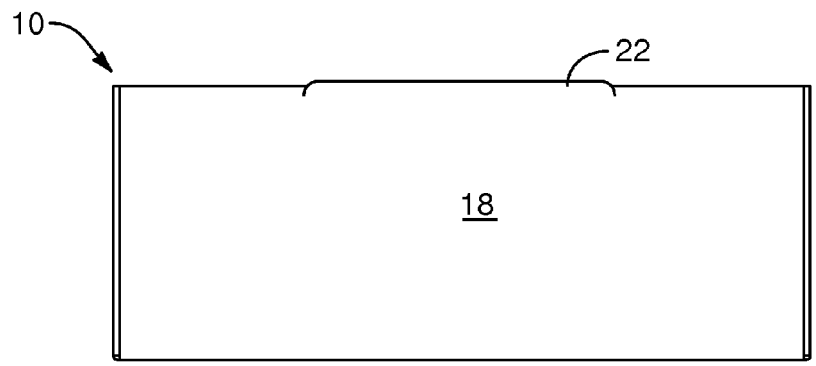
FIG. 6A is a front elevation view of the box of FIG. 1 having the lid in an open condition.
Figure 6B:
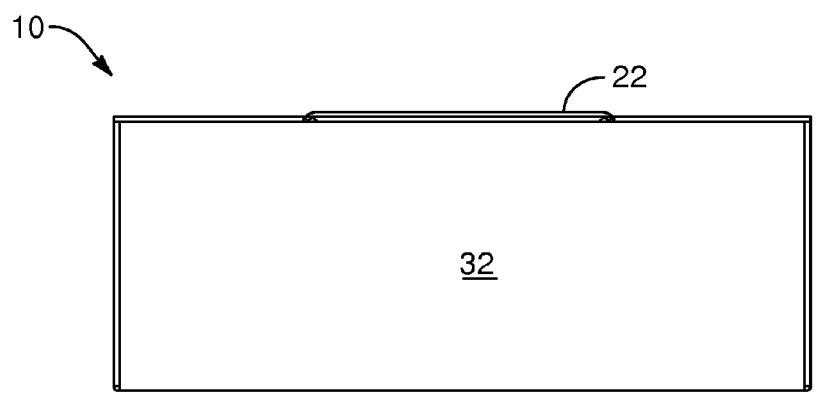
Figure 6C:
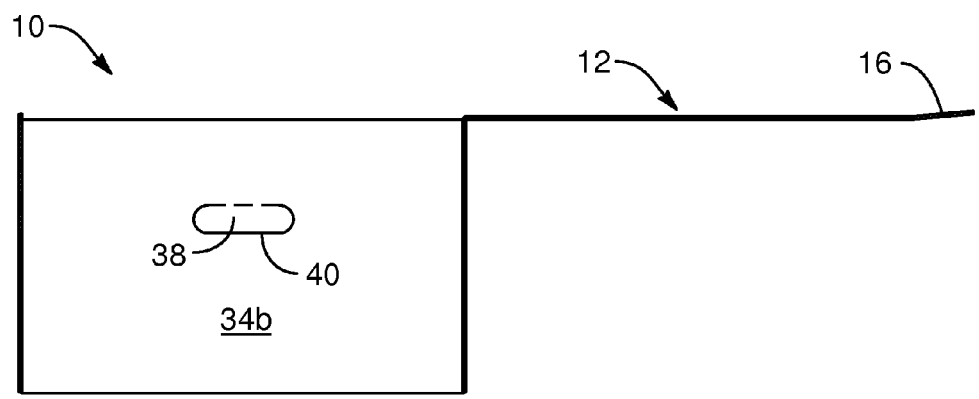
Figure 6D:
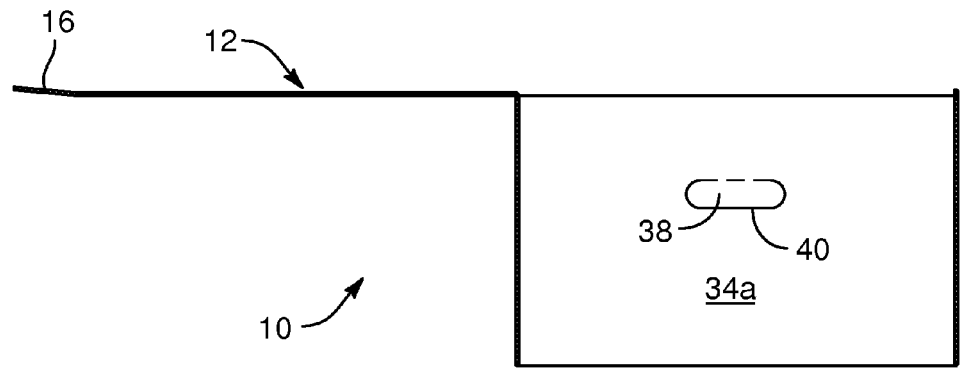
Figure 6E:
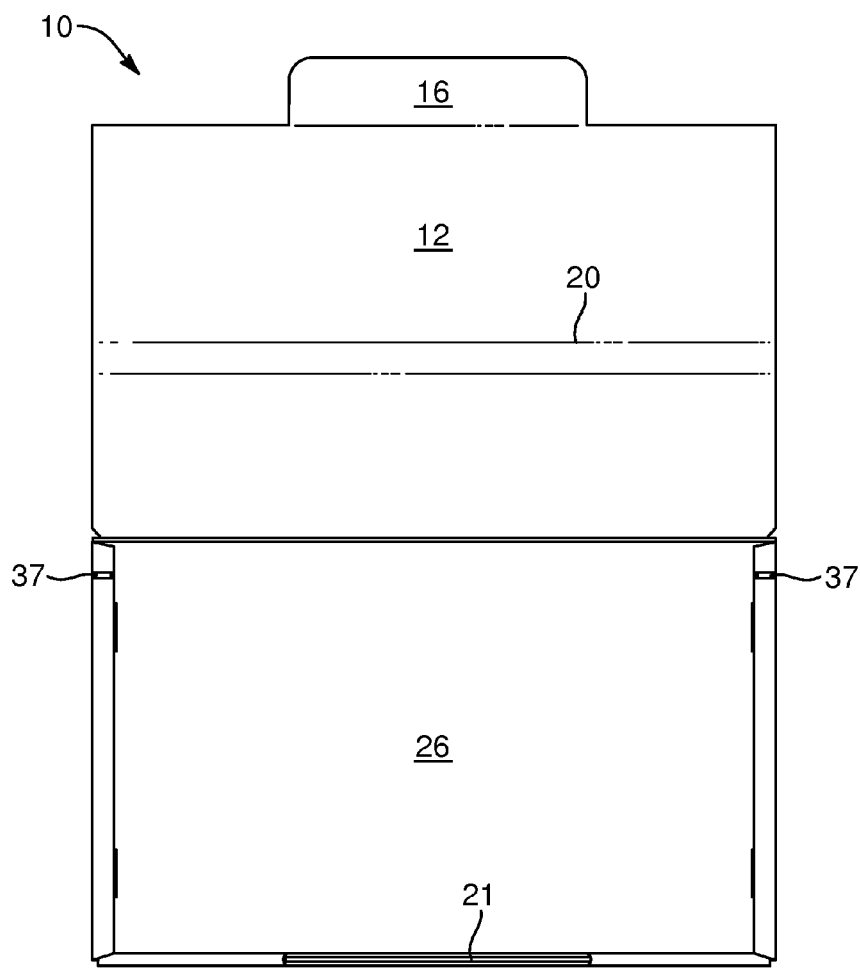
Figure 6F:
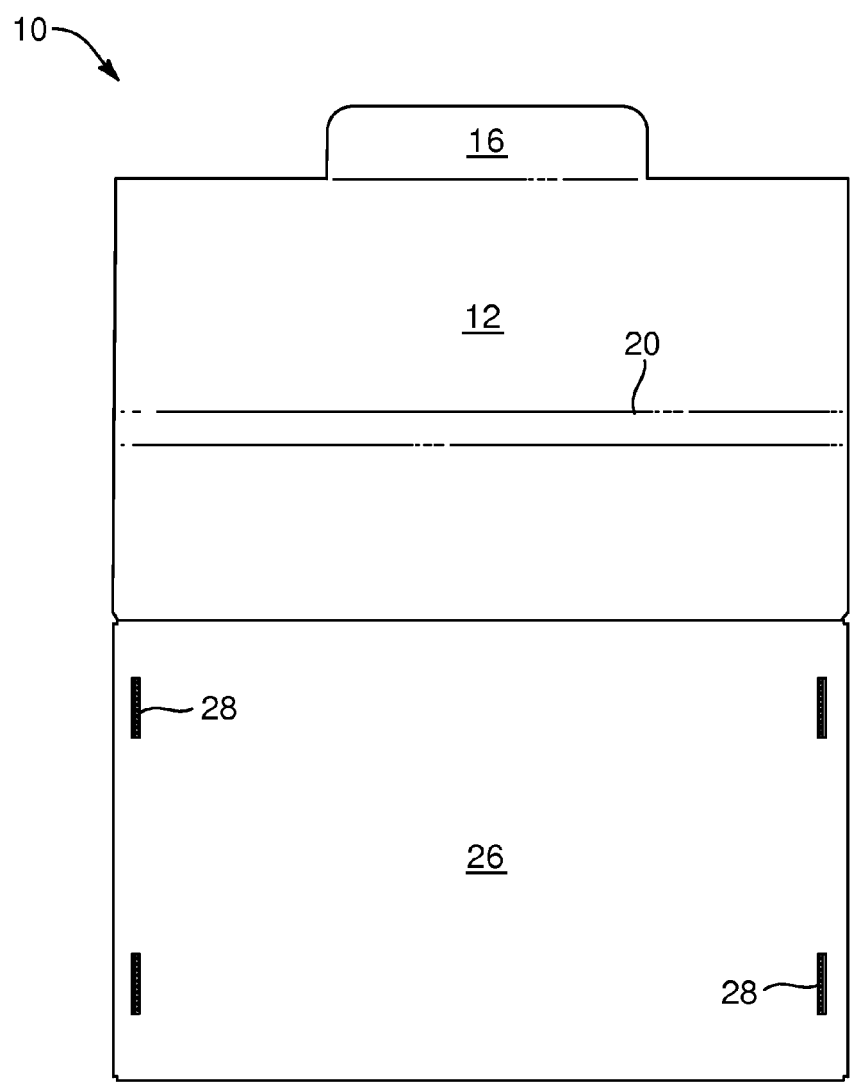
Figure 7A:
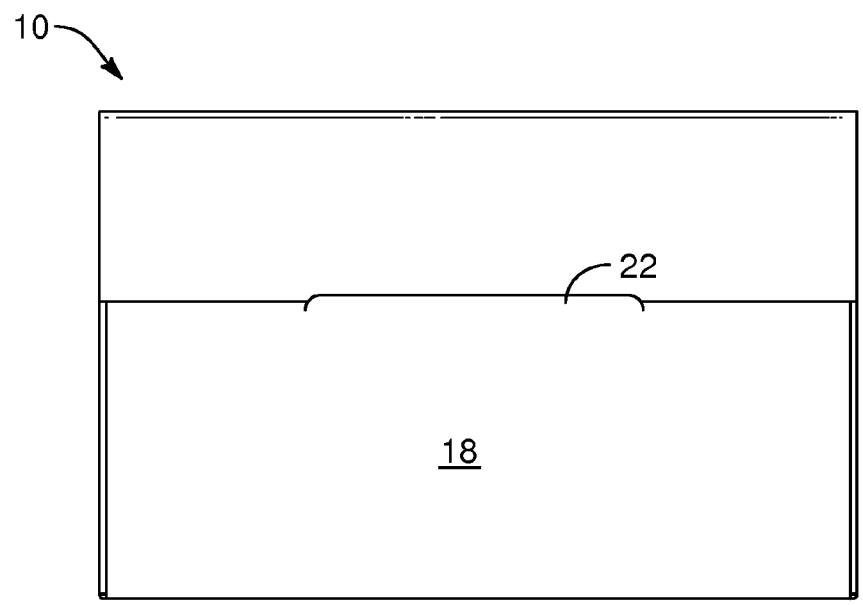
FIG. 7A is a front elevation view of the box of FIGS. 1, 3, and 4 having the lid in a folded lid condition.
Figure 7B:
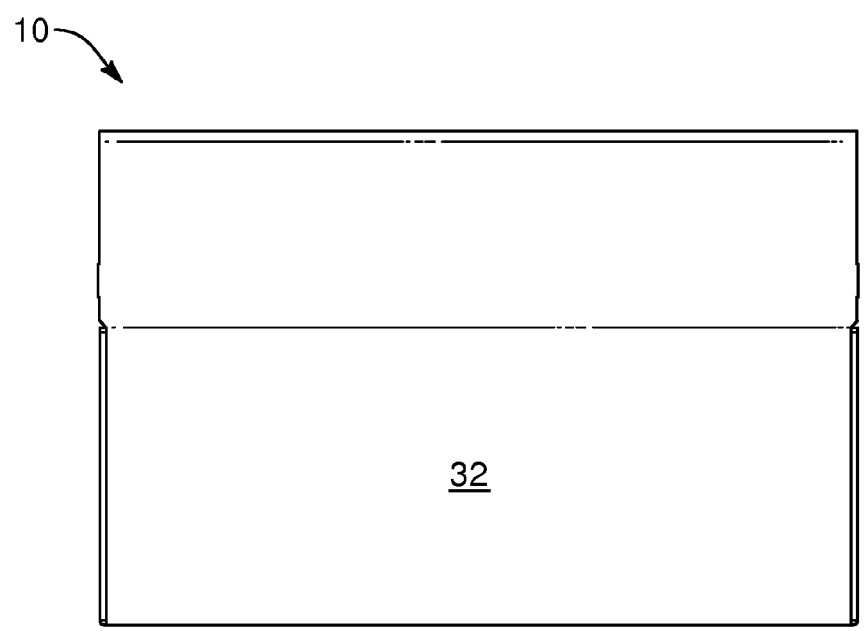
Figure 7C:
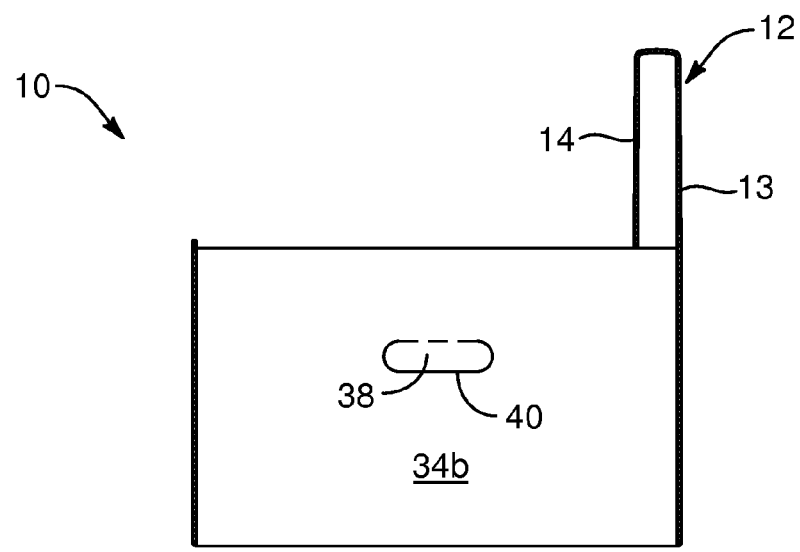
Figure 7D:
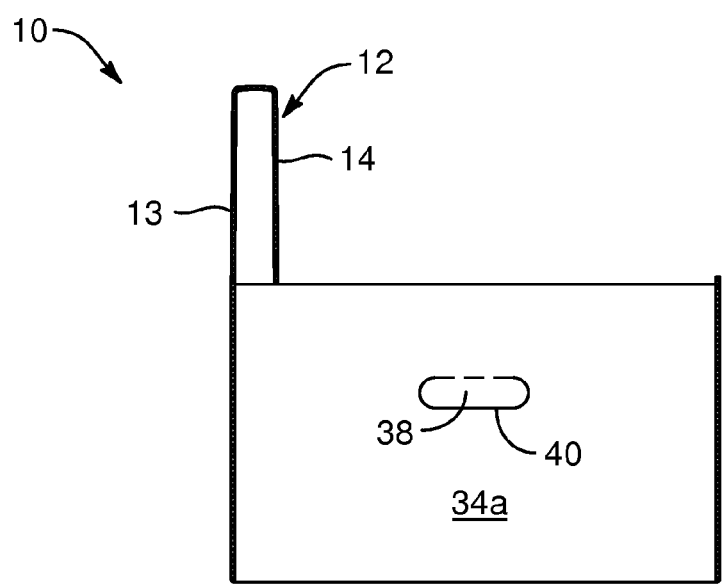
Figure 7E:
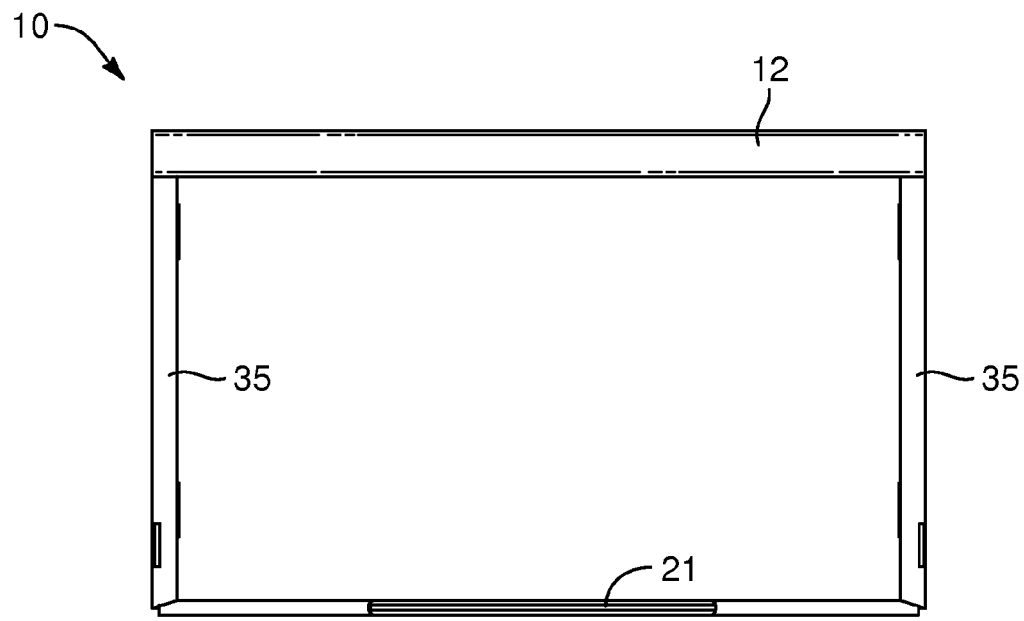
Figure 7F:
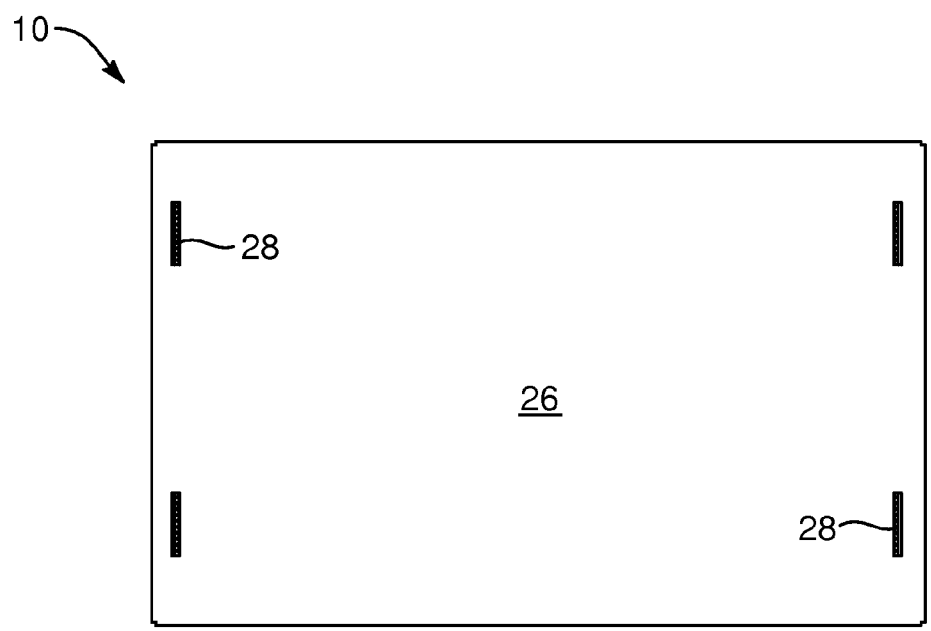
FIG. 7F is a bottom plan view of the box of FIG. 7A.
Figure 8:
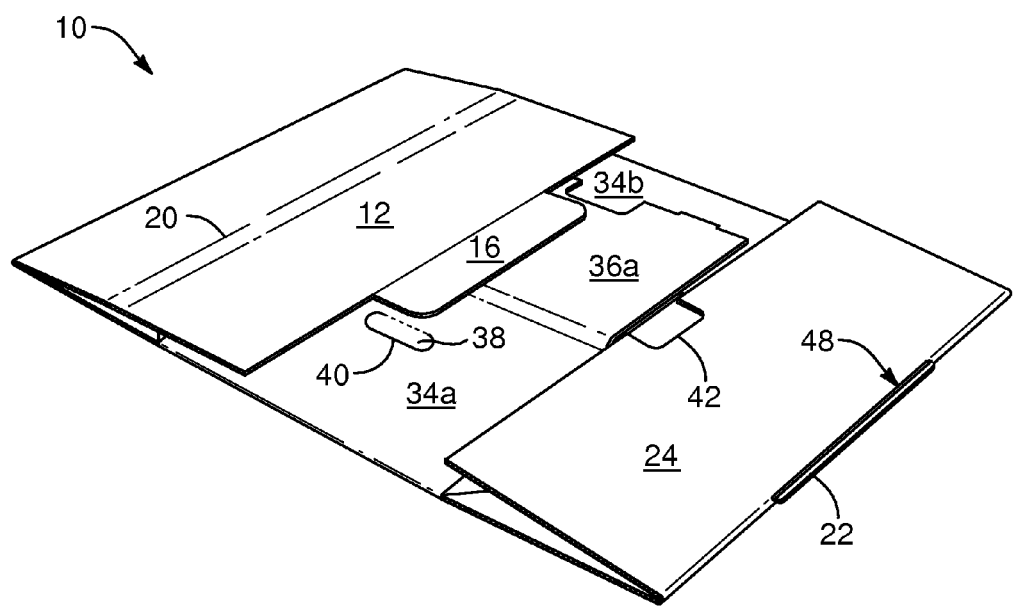
FIG. 8 is an isometric view of the box of FIG. 1 in a knocked-down configuration.
Figure 9A:
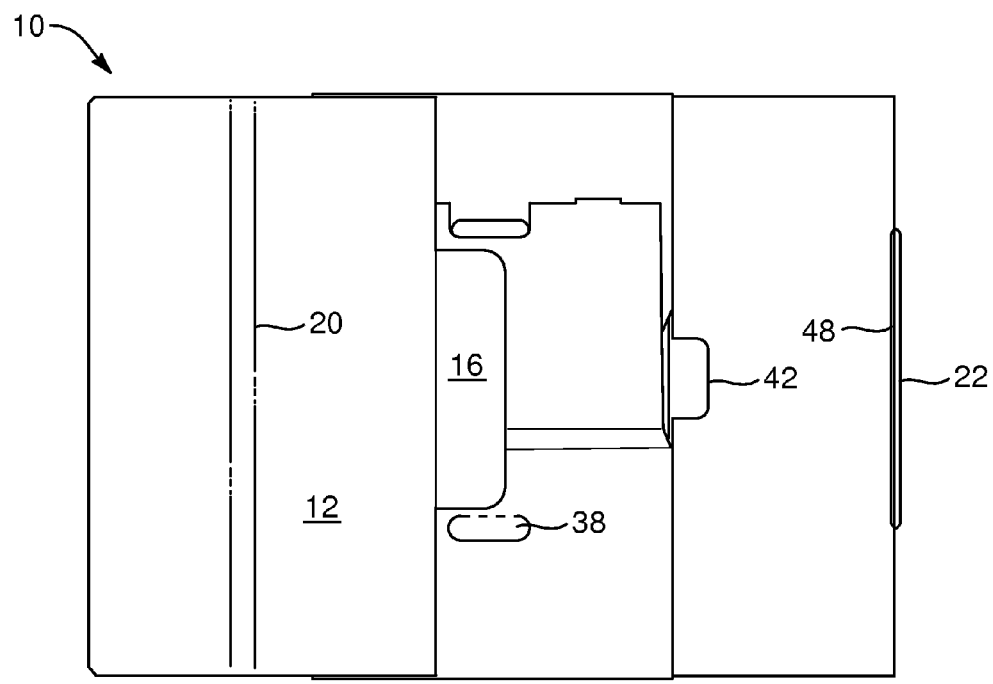
FIG. 9A is a front elevation view of the box of FIG. 1 having the lid in a folded flat, knocked-down configuration.
Figure 9B:
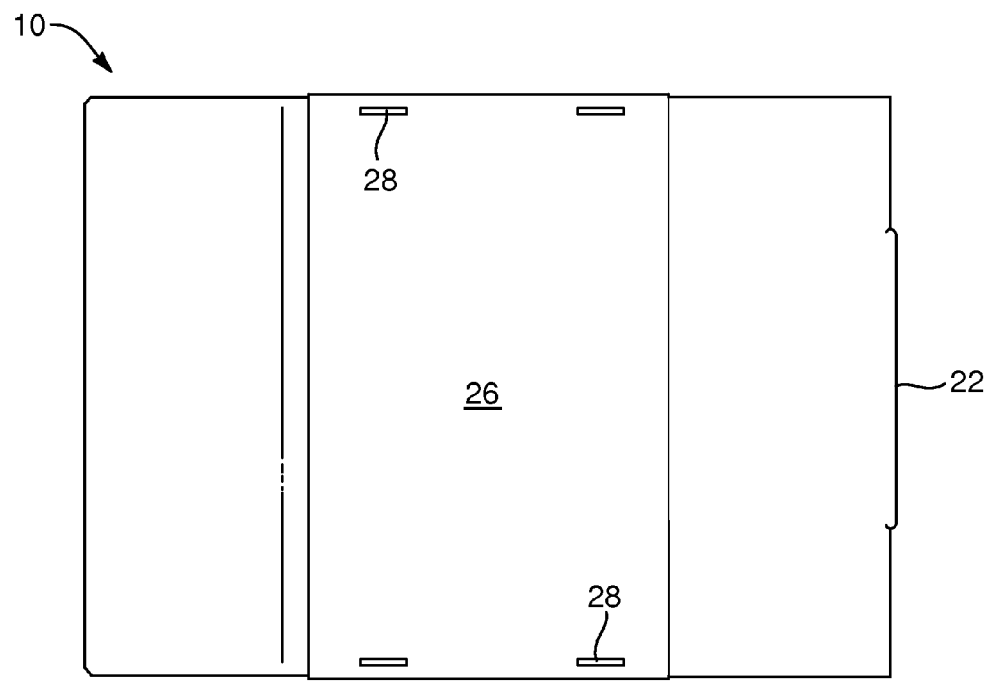
FIG. 9B is a rear elevation view of the box of FIG. 9A.
Figure 9C:
FIG. 9C is a left side elevation view of the box of FIG. 9A.
Figure 9D:
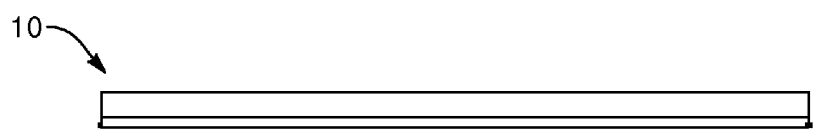
FIG. 9D is a right side elevation view of the box of FIG. 9A.
Figure 9E:
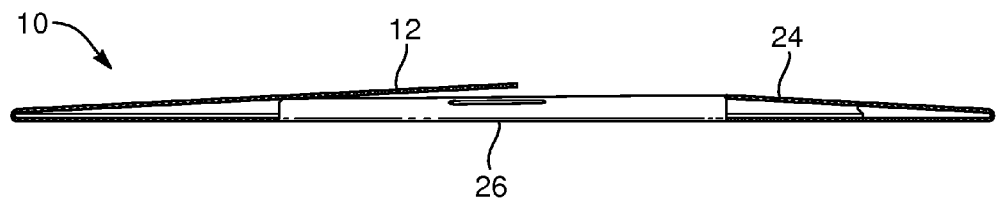
FIG. 9E is a top plan view of the box of FIG. 9A.
Figure 9F:
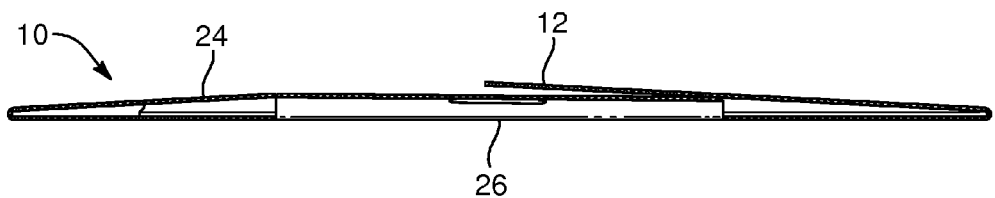
FIG. 9F is a bottom plan view of the box of FIG. 9A.
Figure 10:
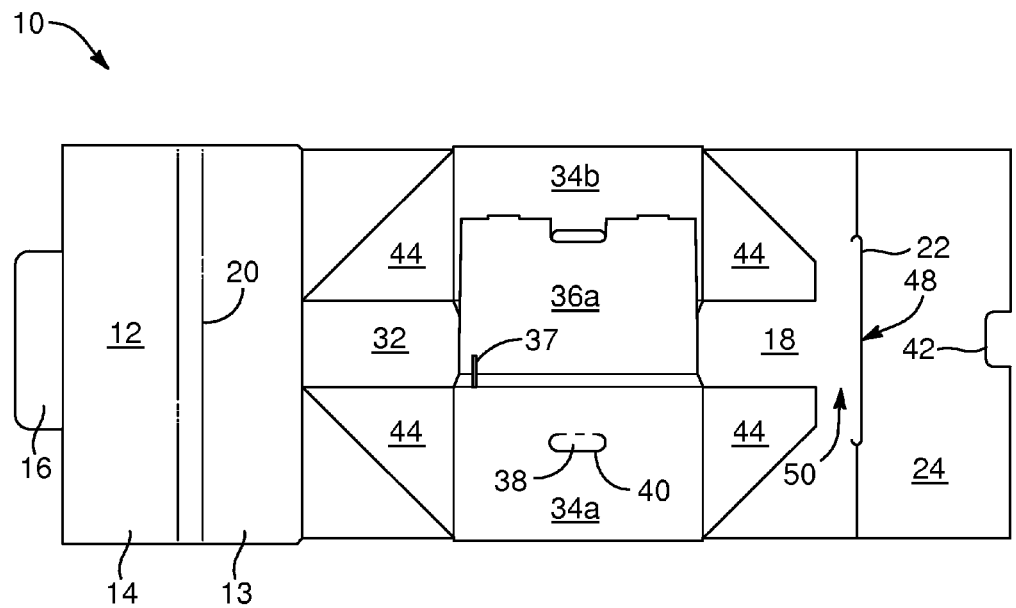
FIG. 10 is a top plan view of the box of FIG. 1, in a knocked-down configuration, and an open condition.
Figure 11:
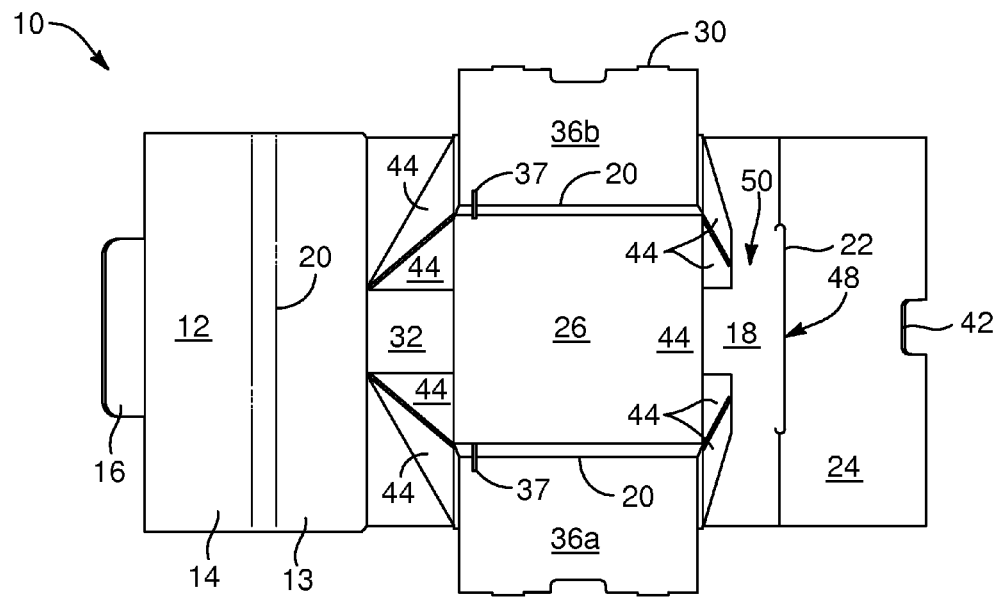
FIG. 11 is a top plan view of the box of FIG. 1 in a semi-assembled or erected configuration, and an open condition.
Figure 12A:
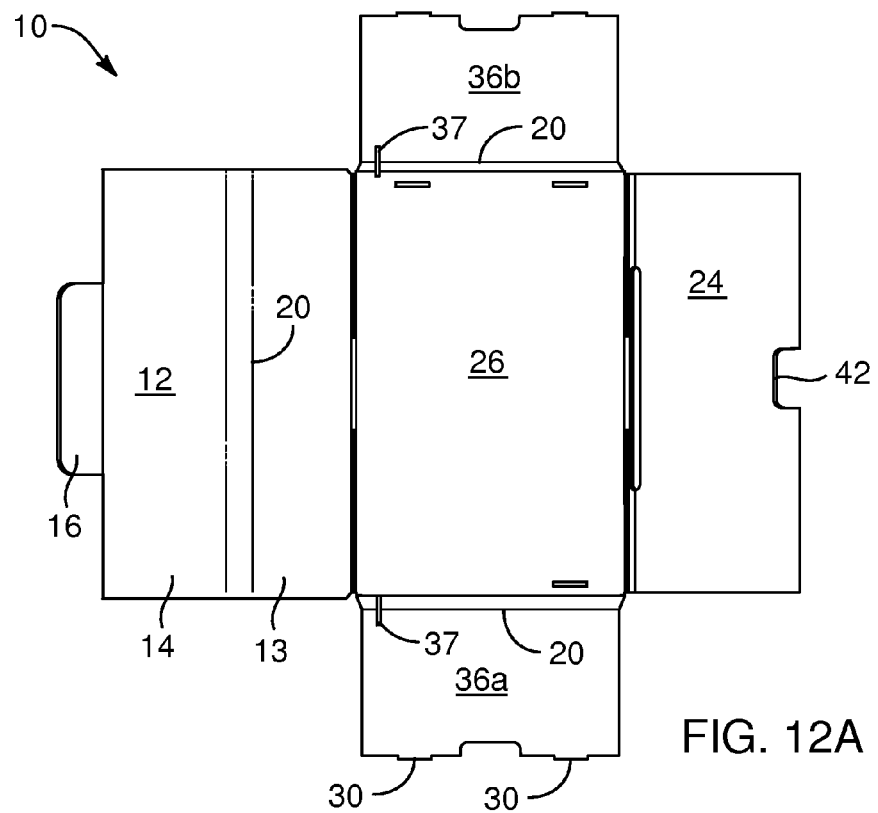
FIG. 12A is a top plan view of the box of FIG. 1, in a partially assembled condition, with the flaps in a fully open condition, notwithstanding the box's front, rear, and end vertical panels have all been completely erected to the assembled configuration.
Figure 12B:
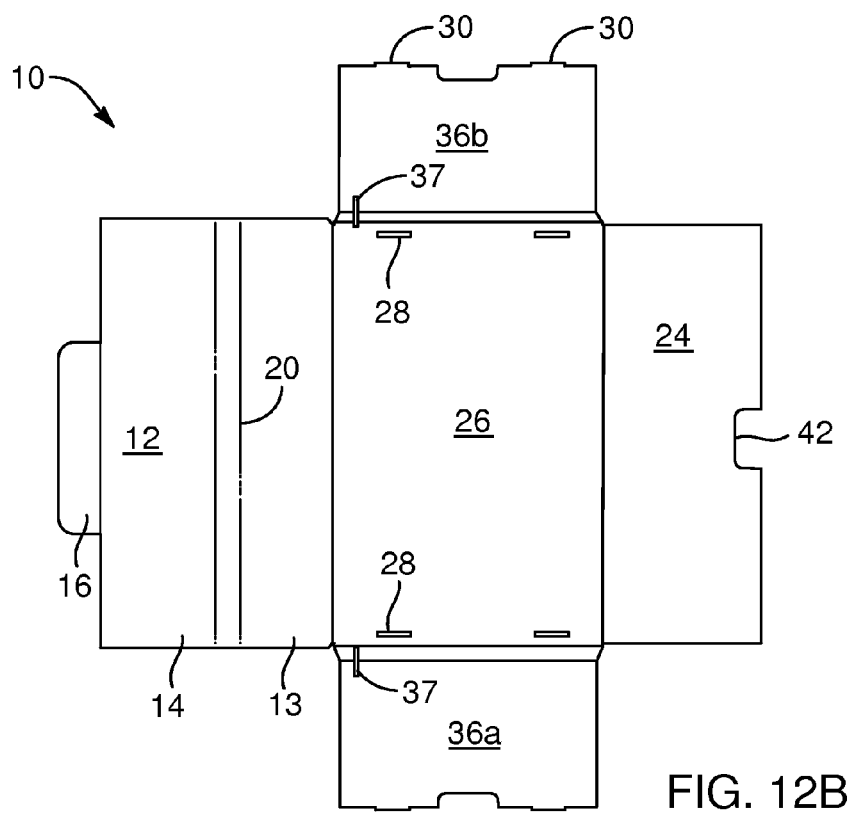
FIG. 12B is a bottom plan view of the box of FIG. 12A.

Referring to FIGS. 2-4, while continuing to refer generally to FIGS. 1-14, in one embodiment of a box 10 in accordance with the invention, the box may be erected from a flat or knocked-down configuration as illustrated in FIG. 8 by opening the box to a fully flat, but extended configuration of FIG. 11. By drawing the end panels 34a, 34b away from one another, the front panel 18 and back panel 32, which are flexibly connected by hinge panels 44 to the end panels 34a, 34b are likewise drawn upward from a flat, knocked-down configuration to the vertical, erected or assembled configuration.

With the box 10 in the assembled configuration, or at least erected with the tuck panels 24, 36 not yet in place, but the front panel 18, back panel 32 and end panels 34 all position substantially upright (e.g. see FIGS. 12A-12B), the box is ready to be locked into place by bending each of the tuck panels 24, 36 downward, beginning with the front tuck panel 24. The end tuck panels 36a, 36b are subsequently folded down, thereby snugging the front panel 18 thereagainst. Likewise is the back panel 32 drawn erect by the lid 12 and rigidized by folding down the end tuck panels 36. The locking tabs 30 at each of the now bottom ends of the respective end tuck panels 36 lock the tuck panels 36 into position which themselves hold the front tuck panel 24 into position, by virtue of the tabs 30 extending into the apertures 28, where they are maintained in a substantially rigid and locked position.

At this point, the face panel 14 (portion 14 of the lid 12) may be folded toward the stand panel 13, along the one or more score lines 20 in the lid 12. A set of slots 37 or other form of retainers 37 may be formed near the back panel 32, in the end walls 34 or end panels 34, the ledges 35, the tuck panels 36, or all thereof. For example, in the illustrated embodiment, the slot may be cut through each of the end tuck panels 36 passing through the ledge 35 but not through the end panels 34a, 34b. In this way, the outermost edge of the face panel 42 may be tucked down, bending at the score line 20 between the face panel 14 and the stand panel 13, in order to hold the edge of the face panel 14 in the retainer 37 or slots 37.

Also, the face panel 14 may thus serve to maintain the end panels 34a, 34b spaced apart the proper distance, while the end panels 34a, 34b and end tuck panels 36a, 36b support the face panel 14. Meanwhile, the face panel 14 is pushing against the stand panel 13, maintaining both in a substantially vertical configuration, spaced close together and near the back panel 32 of the box 10.

Thus, no panels or flaps extend up away from the top edge of the front wall 18 and end walls 34. Meanwhile, the entire lid 12 is held in place, near the back panel 32, and away from a user while loading. In this configuration, as illustrated in FIGS. 3-4, the box 10 is open, stable, and ready to provide unobstructed access to a user loading the box on a shelf, conveyor, or the like.

By way of clarifying the configuration of the box, one may refer to FIGS. 5-14. Referring to FIGS. 5A-5F, while continuing to refer generally to FIGS. 1-14, one may see that the box 10 in the assembled configuration, and the closed condition provides a substantially rigid, rectangular, container functionality.

Referring to FIGS. 6A-6F, the box, in an open condition and an assembled configuration, provides ease of access and stability, but the lid may still obstruct access.

Referring to FIGS. 7A-7F, the various views of the box 10 in the condition of the illustrations of FIGS. 3-4, is shown from all views in the standard orthogonal context. The box 10 is in its assembled configuration, and the loading condition with the lid stored in its stable, restrained, position, out of the way of an operator, and presenting the open box 10 for loading.

Referring to FIG. 8, the knocked-down and folded box 10 is shown ready for assembly, or ready for returning for reuse. In this embodiment, the lid 12 is folded back over the top of the knocked-down box, as is the front tuck panel 24. This provides the substantially minimum footprint for the knocked-down configuration of the box 10.

Referring to FIGS. 9A-9F, the knocked-down box 10 is shown in all its orthogonal views, corresponding to the isometric view of FIG. 8. Here, one sees that the box 10 may have a slight variation in thickness, but lies substantially flat. That is, for example, certain portions of the configuration of FIG. 8 will have hinge panels 44 folded over and held between front panels 18 and back panels 32 as well as end panels 34. Nevertheless, the package is substantially flat, and may be stacked in a self supporting stack or within a container, bundle, bale, or the like, ready for shipping back to another location for reuse.

Figure 13:
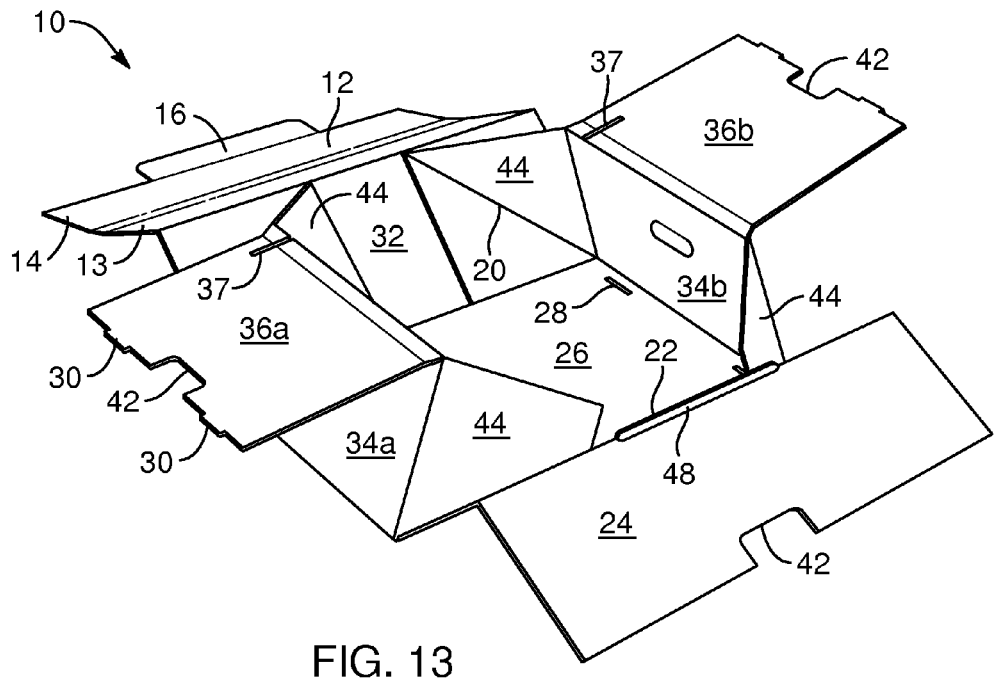
FIG. 13 is a top frontal isometric view of the box of FIG. 1 in a partially erected or assembled configuration, but an unlocked condition.
Figure 14:
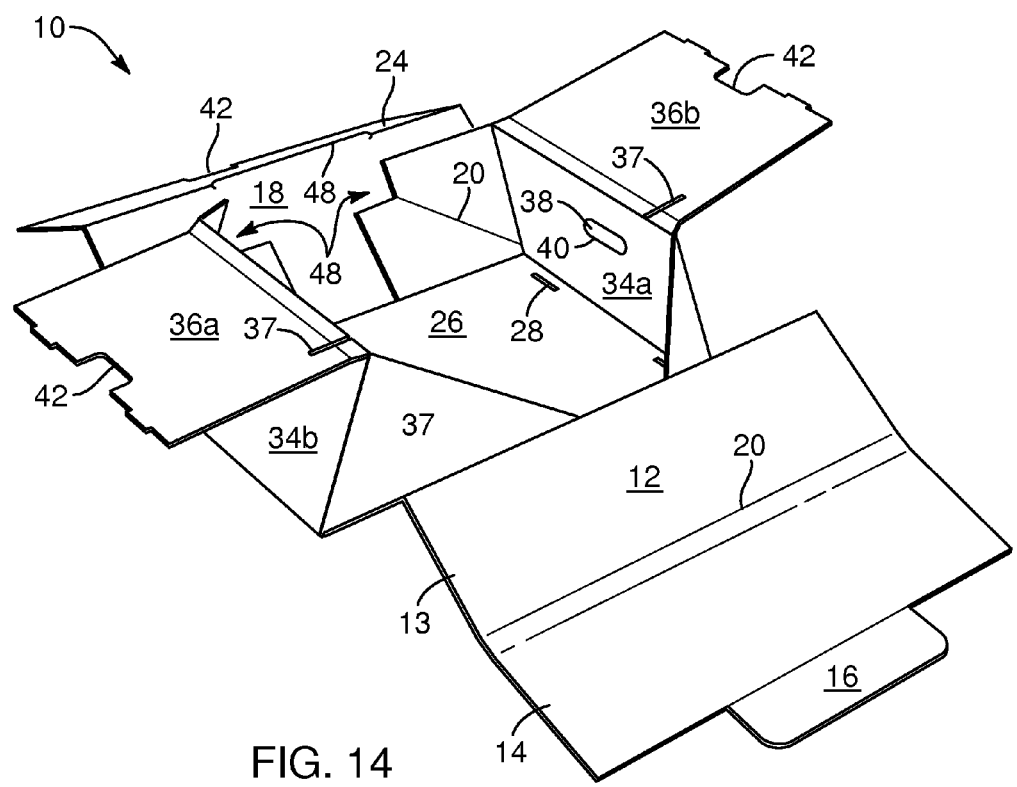
FIG. 14 is a top rear isometric view of the box of FIG. 13.

Referring to FIG. 10, the box 10 is shown entirely flattened. The end tuck panels 3b are flat and parallel. The box 10 is as flat as possible. The lid 12 and front tuck panel 24 are fully extended. The hinge panels 44 are doubled over. Referring to FIG. 11, the front tuck panel 24, and the lid 12 are in their fully open condition, and the box is partially erected or in the semi-assembled configuration, illustrating the various components. The end tuck panels 36 are opened to draw the end panels 34 upward. The relationship between the hinge panels 44, and the other panels 18, 32, 34 that form the vertical walls of the assembled box. Similarly, referring to FIGS. 12A-12B, the top and bottom views of the box 10 in an assembled or upright configuration has progressed from flat in FIG. 10 to partially upright in FIG. 11, to fully upright in FIG. 12. However the tuck panels 24, 36 are not yet engaged. Each is folded into the box 10 to lock it in the fully upright configuration of FIG. 11 is illustrated. Meanwhile, FIGS. 13 and 14 show perspective views of the box 10 in accordance with the invention in the partially upright position of FIG. 11 on the way to the fully assembled configuration, but with the tuck panels 24, 36 still in the open condition to make each feature visible.

Referring now to all FIGS. 1-15, the process for using the box 10 may include shipping the new boxes 10 in a knocked-down configuration of FIGS. 8-9 to a point of use. The configuration of FIG. 10 is flatter, but has a larger footprint. At the point of use, a user may begin to open a box in a knocked-down configuration, by opening the lid 12 and front tuck panel 24 away from the rest of the stack, and outward therefrom as shown in FIG. 10. This gives access to the end tucks 36.

Gripping end panels 34, or the end tuck panels 36, a user may now lift the top edges of the end panels 34 away from the bottom panel 26. This action draws the top edges of the front panel 18 and back panel 32 together by virtue of the hinge panels 44. The hinge panels 44 are connected between the end panels 34 (extending from the front and back edges thereof) and the front and back panels 18, 32 (by being glued or otherwise secured to the inner surfaces thereof). Once the box 10 has taken on the upright configuration, the front tuck panel 24 may be folded down, toward the bottom panel 26 and against the front panel 18. This stabilizes the end panels 34 with respect to one another by gauging apart the end panels 34 separation distance and providing an additional sheer panel layer in addition to the front panel 18.

Next the end tuck panels 36a-36b may then be folded down along the score lines between the tuck panels 36 and the ledges 35, as well as along the score lines between the ledges 35 and the end panels 34a, 34b. In this way, the tuck panels 36 may be folded over to form the ledge 35, and then down toward the bottom panel 36 and against the end panels 34. The ledge 35 and tabs 30 in the apertures 28 keep the end tuck panels. Spaced away from the end panels 34 by the size of the ledges 35.

Next, the lid 12 may be folded along the one or more score lines 20 to form the stand panel 13 as an extension of the back panel 32 of the box 10 as shown in FIGS. 3, 4 and 7. The face panel 14 may be effectively locked back by insertion in the retainer slots 37 or held by any other form of the retainer 37 in order to hold up the stand panel 13 and the face panel 14 out of the way for loading or unloading. In one option a single score line 20 may act as a vertex of a triangular cross section of the stand panel 13 and face panel 14 on a base formed by the end panels 34, or rather a very short segment of the end panels 34 as the base. The height of the stand 13 and face panels 14 stabilize the long narrow distance that such a triangulation extends between the two end panels 34a, 34b.

With the box 10 in the assembled configuration, and the open, receiving condition with the lid in a restrained condition, a user may now stand near the front panel 18 of the box 10 and load the box 10. Upon loading the box 10, a user may then draw the face panel 14 up and away from the retainer 37. Pulling the face panel 14 toward the front panel 18 will extend the lid to almost its full extent. Accordingly, the stand panel 13 and face panel 14 now flatten out together in the same plane, which may then be laid down on top of the ledges 35, and the top edge of the front panel 18.

In certain conditions, the hinge panels 44 may be provided with a certain amount of relief 46 sized and shaped to match the tongue panel 16 in order to avoid interference and damage of the tongue panel 16 for later reuse.

The tongue panel 16 may be placed against the guide tab guiding it down into the slot 21. The slot 21 is formed in the front panel 18 by cutting a relief space 48 from the front tuck panel 24, and leaving the cut out material rigidly attached to the front panel. Bending the front tuck 24 back leaves the guide 46 extending upward and a relief space 48 behind it. Thus, the lid 12 may be provided a tensile support extending the lid 12 across the box 10 from the back panel 32 to the front panel 18 in tension. In the event that the box is loaded by stacking other materials on top of it, the load is supported by double walls at the front panel 18, back panel 32 and end panel 34. The tongue panel 16 on the front edge of the lid 12 may hold the lid forward, toward the front panel 18, draw the back panel 32 toward the front panel 18, and maintain the dimensionality of the box 10 under load in transit. However, loading the end panels 34 also holds them apart, drawing the front 18 and back panels 32 together. This is shown in FIGS. 1 and 5. Optionally, providing tongue panels 16 at the end edges of the lid 12 may provide tensile loading of the lid 12 between the end panels 34a, 34b as a result of the pressures of the contents of the box 10 pushing against the tuck panels 36 and ends 34, and thus may hold these together by virtue of a tensile load end-to-end in the lid 12. However this requires extra steps and hands, and may be more cumbersome to close.

The box 10 in the assembled configuration, and the loaded condition, with the lid 12 in the closed condition (e.g. FIGS. 1 and 5A-5F), is now ready for transport. The box 10 may be stacked, moved, and otherwise readied for transport. The box 10 may be transported to a new location where it may be stockpiled and eventually opened for removal of the contents.

Upon removal of the contents, or at the time of removal of the contents, the box 10 may be returned to the condition of FIGS. 3, 4 and 7 (i.e. 7A-7F) with the open, non-obstructing lid 12. Drawing the tongue panel 16 out from the slot 21, is followed by tucking the face panel 14 at the extreme outermost edge thereof, into the slots 37 or other retainers 37 proximate the end panels 34a, 34b. In this way, the box 10 may be emptied just as it was filled, with no flaps of any type presenting any significant obstruction to removal of the contents by a user and placement near the box 10.

During handling, handles 38 may be used as formed in the end panels 34. Each of the handles 38 may be formed by making a cut 40 representing the circular portions and one of the adjoining straight portions of an oval shape. The extended oval shape may be left attached along the upper, straight, fold line that would otherwise connect the semi-circular or curved portions of the long oval.

In this way, a user may push the handle portion 38 into the end panel 34, separating the handle portion 38 along the cut 40. The handle portion 38 doubles under, forming a smooth surface, rather than a ragged edge or sharp edge for lifting.

Handles 42 may also be formed in the tuck portions 24, 36 or tuck panels 24, 36. In this instance, no benefit is served by leaving a handle portion 38 connected. Instead, the cuts 40 may be made complete, leaving a relief 42 or handle 42 for gripping near the extreme edges of each of the tucks 24, 36, or tuck panels 24, 36. Accordingly, once the box 10 is empty, a user may reach a hand in to push the corresponding front panel 18 away, grasp the handle 42, and draw the tuck panel 24 upward and out away from the bottom panel 26 of the box 10. Similarly, the end tuck panels 36 may be drawn away from the end panels 34 to lift them upward, outward, and away from the bottom panel 26 of the box 10.

Now, the box 10 is in a configuration of upright assembly, but a condition of the flaps being unlocked and extended out.

By extending each of the end tuck panels 36 parallel to and directly out from the respective end panel 34 (extending the same direction), the end panels 34 may be folded together. This action collapses the front panel 18 and back panel 32 of the box 10 inward into the knocked-down configuration.

Once in the knocked-down configuration with the lid 12 and front tuck panel 24 both in a fully extended condition, the tuck panel 24 and the lid 12 may both be folded over the top of the now-flattened box 10 in the knocked-down configuration to place the box 10 in a shipping configuration with minimum footprint and optimum thickness.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus formed from a single piece of planar material as a continuous and contiguous structure, foldable into a re-usable, knock-down box, the apparatus comprising:
    a bottom panel to support contents placeable in the box and provided with bottom apertures;
    a front panel operating as a shear wall to support the bottom;
    a rear panel operating as a shear wall to support the bottom;
    end panels adjacent to and extending between the front panel, rear panel, and bottom panel;
    a plurality of hinge panels, each hinge panel thereof formed with a free portion, extending continuously from an edge of one of the end, front, and rear panels and flexibly connected therewith, and a fixed portion, fixed rigidly, permanently, and parallel to a surface of an adjacent one of the end, front, and rear panels to erect together, simultaneously, and fix the positions of the front, rear, and end panels with respect to each other and the bottom panel in an assembled configuration, the plurality of hinge panels being connected to fold closed in and draw the front and end panels down substantially co-planar with their respective end panels in a knocked down configuration;
    the plurality of hinge panels wherein the each hinge panel is further formed with a score region, between the free and fixed portions, bending therealong to form a hinge line;
    a front tuck panel extending downward from proximate the top of the front panel to proximate the bottom panel and provided with a front slot formed proximate a score between the front panel and the front tuck panel;
    end tuck panels extending from proximate the top of each respective end wall and extending downward to be fixed with respect to the bottom panel by tabs extending therefrom into the bottom apertures;
    a lid flexibly secured to the rear panel to selectively tilt with respect thereto between an open position away from the front panel and a closed position substantially in contact with the front panel, the lid having a front lock tab extending therefrom to fit within the front slot; and
    the front panel further comprising a registration panel extending above the front slot to receive the front lock tab therein, registering the front lock tab upon contact therewith and urging the front lock tab into the front slot.

2. The apparatus of claim 1, further comprising a ledge extending horizontally, spacing apart, respectively, each end panel from the corresponding end tuck panel in an assembled configuration.

3. The apparatus of claim 2, wherein;
    the ledge is positioned to support the lid panel in a vertical direction when the apparatus is in the assembled configuration;
    the ledge provides a connector between the respective end panel and end tuck panel in a knocked-down configuration; and
    the lid and the front tuck panel extend toward one another in the knocked down configuration.

4. The apparatus of claim 3, wherein:
    the end panels are each provided with a handle comprising a knockout portion secured to an edge of an aperture therein; and
    the ledge in each end panel is positioned to provide space, between the respective end panel and corresponding end tuck panel, for fingers of a user gripping the corresponding handle.

5. The apparatus of claim 4, wherein:
    the lid is provided with a lid score defining a stand portion and a face portion of the lid;
    at least one of the end panels, end tuck panels, and corresponding ledges is provided with a retainer formed and positioned to hold the box ready for filling, with the entire lid retained proximate the back panel, by receiving and holding an edge of the face portion of the lid proximate the retainer.

6. The apparatus of claim 1, wherein at least one of the front tuck and end tuck panels is provided with a handle, sized and positioned to receive a hand of a user applying force thereto to effect knockdown of the apparatus by removal of the respective front and end tuck panel from proximate the bottom panel.

7. The apparatus of claim 6, further comprising a plurality of lock tabs, each extending from at least one edge of the lid and extending into a slot proximate a corresponding one of the end and front tuck panels.

8. The apparatus of claim 1, further comprising a lock tab extending from at least one edge of the lid and extending into a slot proximate a corresponding one of the end and front tuck panels.

9. A box comprising:
    a single piece of planar material having uniform properties with respect to the planar extent;
    the single piece formed into a plurality of panels, each continuous and contiguous with at least one other one thereof; and
    the single piece, wherein the plurality of panels comprises
    a bottom panel to support contents placeable in the box and provided with bottom apertures,
    a front panel operating as a shear wall to support the bottom,
    a rear panel operating as a shear wall to support the bottom,
    end panels adjacent to and extending between the front panel, rear panel, and bottom panel,
    a plurality of hinge panels, each hinge panel thereof formed with a free portion, extending continuously and contiguously from an edge of one of the end, front, and rear panels, and a fixed portion, fixed permanently to a surface of an adjacent one of the end, front, and rear panels to erect all thereof together in response to movement of any thereof toward an erected position, and to fix the positions of the front, rear, and end panels with respect to each other and the bottom panel in an assembled configuration, the plurality of hinge panels, wherein the each hinge panel is further formed with a score region, between the free and fixed portions, bending therealong to form a hinge line, the plurality of hinge panels further connected to re-fold closed, drawing the front and end panels down substantially coplanar with their respective end panels, a front tuck panel extending downward from proximate the top of the front panel to proximate the bottom panel and provided with a front slot formed proximate a score between the front panel and the front tuck panel;

end tuck panels extending from proximate the top of each respective end panel and extending downward to be fixed with respect to the bottom panel in the bottom apertures, a lid flexibly secured to the rear panel to selectively tilt with respect thereto between an open position away from the front panel and a closed position substantially in contact with the front panel and having a front lock tab extending therefrom to fit within the front slot;

the front panel further comprising a registration panel extending above the front slot to receive the front lock tab therein, registering the front lock tab upon contact therewith and urging the front lock tab into the front slot;

a ledge extending horizontally, spacing apart, respectively, and interconnecting, each end panel with respect to the corresponding end tuck panel in an assembled configuration, the ledge being positioned to support the lid panel in a vertical direction when the box is in the assembled configuration, the lid and the front tuck panel extending toward one another in the knocked down configuration.

10. The apparatus of claim 9, wherein:

the end panels are each provided with a handle comprising a knockout portion secured to an edge of an aperture therein; and the ledge in each end panel is positioned to provide space, between the respective end panel and corresponding end tuck panel, for fingers of a user gripping the corresponding handle.

11. The apparatus of claim 10, wherein:

the lid is provided with a lid score defining a stand portion and a face portion of the lid;

at least one of the end panels, end tuck panels, and corresponding ledges is provided with a retainer formed and positioned to hold the box ready for filling, with the entire lid retained proximate the back panel, by receiving and holding an edge of the face portion of the lid proximate the retainer.

12. The apparatus of claim 11, wherein at least one of the front tuck and end tuck panels is provided with a handle, sized and positioned to receive a hand of a user applying force thereto to effect knockdown of the apparatus by removal of the respective front and end tuck panel from proximate the bottom panel.

13. The apparatus of claim 12, further comprising a lock tab extending from at least one edge of the lid and extending into a slot proximate a corresponding one of the end and front tuck panels.

14. The apparatus of claim 13, further comprising a plurality of lock tabs, each extending from at least one edge of the lid and extending into a slot proximate a corresponding one of the end and front tuck panels.

15. A box, repeatedly and selectively configurable between a knocked down configuration and an assembled configuration and constituted by a single piece of planar material having uniform properties with respect to the planar extent and formed into a plurality of panels, each continuous and contiguous with at least one other one thereof, the panels comprising:

a bottom panel to support contents placeable in the box and provided with bottom apertures;

a front panel operating as a shear wall to support the bottom;

a rear panel operating as a shear wall to support the bottom;

end panels adjacent to and extending between the front panel, rear panel, and bottom panel;

a plurality of hinge panels, each hinge panel thereof formed with a free portion, extending continuously and contiguously from an edge of one of the end, front, and rear panels, and a fixed portion, fixed permanently to a surface of an adjacent one of the end, front, and rear panels to erect all thereof together in response to movement of any thereof toward an erected position, and to fix the positions of the front, rear, and end panels with respect to each other and the bottom panel in an assembled configuration;

the plurality of hinge panels, wherein the each hinge panel is further formed with a score region, between the free and fixed portions, bending therealong to form a hinge line, the plurality of hinge panels further connected to re-fold closed, drawing the front and end panels down substantially coplanar with their respective end panels;

a front tuck panel extending downward from proximate the top of the front panel to proximate the bottom panel and provided with a front slot formed proximate a score between the front panel and the front tuck panel;

end tuck panels extending from proximate the top of each respective end panel and extending downward to be fixed with respect to the bottom panel in the bottom apertures;

a lid flexibly secured to the rear panel to selectively tilt with respect thereto between an open position away from the front panel and a closed position substantially in contact with the front panel and having a front lock tab extending therefrom to fit within the front slot;

the front panel further comprising a registration panel extending above the front slot to receive the front lock tab therein, registering the front lock tab upon contact therewith and urging the front lock tab into the front slot.

* * * * *